United States Patent
Carley et al.

(10) Patent No.: US 10,649,595 B2
(45) Date of Patent: May 12, 2020

(54) TOUCH SENSOR WITH FORCE SENSOR RESPONSE NORMALIZATION, AND RELATED METHOD AND APPARATUS

(71) Applicant: Atmel Corporation, San Jose, CA (US)

(72) Inventors: Carl Carley, Basingstoke (GB); Paul Clements, Meonstoke (GB); Karl Attrill, Fareham (GB); Thomas Matthew Bell, Southampton (GB)

(73) Assignee: Atmel Corporation, San Jose, CA (US)

( * ) Notice: Subject to any disclaimer, the term of this patent is extended or adjusted under 35 U.S.C. 154(b) by 27 days.

(21) Appl. No.: 15/908,182

(22) Filed: Feb. 28, 2018

(65) Prior Publication Data

US 2018/0253169 A1 Sep. 6, 2018

Related U.S. Application Data

(60) Provisional application No. 62/466,785, filed on Mar. 3, 2017.

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01); *G06F 2203/04105* (2013.01)

(58) Field of Classification Search
CPC ......... G06F 2203/04105; G06F 3/0416; G06F 3/044
See application file for complete search history.

(56) References Cited

U.S. PATENT DOCUMENTS

| | | |
|---|---|---|
| 9,500,552 B2 | 11/2016 | Williams |
| 2016/0179229 A1* | 6/2016 | Ahn ........................ G06F 3/041 345/173 |
| 2016/0282999 A1 | 9/2016 | Hwang et al. |
| 2016/0334912 A1 | 11/2016 | Protasio Ribeiro |
| 2016/0334919 A1 | 11/2016 | Zhu et al. |
| 2016/0349906 A1 | 12/2016 | Lee et al. |
| 2017/0045976 A1 | 2/2017 | Bushnell et al. |
| 2017/0300167 A1 | 10/2017 | Lee et al. |

(Continued)

FOREIGN PATENT DOCUMENTS

| | | |
|---|---|---|
| CN | 105955533 A | 9/2016 |
| TW | M533773 U | 12/2016 |

(Continued)

OTHER PUBLICATIONS

Written Opinion of the International Searching Authority for PCT Application No. PCT/IB2018/000282, dated Jul. 4, 2018, 14 pages.

(Continued)

*Primary Examiner* — Chun-Nan Lin
(74) *Attorney, Agent, or Firm* — TraskBritt

(57) ABSTRACT

In one embodiment, a touch screen device includes a controller, a force sensing layer, a cushion layer, and a reference layer. The controller includes a processor to determine a distance between the force sensing layer and the reference layer. The cushion layer is between the force sensing layer and the reference layer. The cushion layer may include a plurality of holes at selected locations devoid of material of which the cushion layer is made. The reference layer may include a plurality of raised areas at selected locations.

18 Claims, 7 Drawing Sheets

(56) References Cited

U.S. PATENT DOCUMENTS

2017/0336900 A1* 11/2017 Lee ..................... G06F 3/0414
2018/0039367 A1* 2/2018 Suzuki ................ G06F 3/0414

FOREIGN PATENT DOCUMENTS

| TW | M537260 U | 2/2017 |
| WO | 2016/075901 A1 | 5/2016 |
| WO | 2016/168283 A1 | 10/2016 |

OTHER PUBLICATIONS

International Search Report for PCT Application No. PCT/IB2018/000282, dated Jul. 4, 2018, five pages.
TW Office Action & Search Report dated Oct. 11, 2018 for TW Application No. 107107086, 6 pages with English translation.

* cited by examiner

TOUCH SENSOR WITH FORCE SENSOR RESPONSE NORMALIZATION, AND RELATED METHOD AND APPARATUS

CROSS-REFERENCE TO RELATED APPLICATION

This application claims the benefit under 35 U.S.C. § 119(e) of U.S. Provisional Patent Application Ser. No. 62/466,785, filed Mar. 3, 2017, the disclosure of which is hereby incorporated herein in its entirety by this reference.

TECHNICAL FIELD

This disclosure generally relates to touch sensors and, more particularly, to a touch sensor exhibiting normalized force sensor response, and related methods and apparatus.

BACKGROUND

A touch-position sensor, or a touch sensor, may be used to detect the presence and location of an object or the proximity of an object (such as a user's finger or a stylus) within a touch-sensitive area of the touch sensor overlaid, for example, on a display screen. In a touch sensitive display application, the touch position sensor may enable a user to interact directly with what is displayed on the screen, rather than indirectly with a mouse or touch pad. A touch sensor may be attached to or provided as a part of a more complex apparatus such as, for example, a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch position sensors, such as (for example) resistive touch screens, surface acoustic wave touch screens, and capacitive touch screens. Herein, reference to a touch sensor may encompass a touch screen, and vice versa, where appropriate. When an object touches or comes within proximity of the surface of a capacitive touch screen, a change in capacitance may occur within the touch screen at the location of the touch or proximity. A controller may process the change in capacitance to determine its position on the touch screen.

BRIEF SUMMARY

In an embodiment, a touch screen device comprises a controller comprising a processor, the processor configured to detect a capacitance between locations of a force sensing layer and corresponding locations of a reference layer spaced from the force sensing layer responsive to an initiated voltage, and a cushion layer between the force sensing layer and the reference layer, the cushion layer comprising a foam material that is configured to compress under applied force and to expand toward an original thickness when the applied force is released.

In another embodiment, an apparatus comprises a force sensing layer, a reference layer spaced from and aligned with the force sensing layer, electrode locations within an area between the force sensing layer and the reference layer, and a cushion layer between the force sensing layer and the reference layer. At least one of the reference layer and the cushion layer is configured to substantially normalize capacitance at electrode locations within the area responsive to a given applied virtual or physical force when a voltage is applied at the electrode locations.

In a further embodiment, a touch screen device comprises a controller comprising a processor, the processor configured to detect a capacitance between locations of a force sensing layer and corresponding locations of a reference layer spaced from the force sensing layer responsive to an initiated voltage and a cushion layer between the force sensing layer and the reference layer, wherein the reference layer comprises an outer perimeter region and a center region, wherein the reference layer comprises discrete, laterally spaced raised areas, and wherein each of the raised areas has a height and one or more of a density of raised areas and the height of raised areas being different proximate the outer perimeter region of the cushion layer than proximate the center region of the cushion layer.

In a further embodiment, a method of operating a touch screen assembly comprises applying a force to different locations on a touch screen and substantially linearizing a capacitive response to the applied force at the different locations.

BRIEF DESCRIPTION OF THE DRAWINGS

For a more complete understanding of the present disclosure and its advantages, reference is made to the following descriptions, taken in conjunction with the accompanying drawings, in which.

DETAILED DESCRIPTION

In one embodiment, a touch screen device includes a controller, a force sensing layer, a cushion layer, and a reference layer. The controller includes a processor that is programmed to determine a capacitance between the force sensing layer and the reference layer, the capacitance value being indicative of a distance between corresponding locations on the force sensing layer and the reference layer. The cushion layer is located between the force sensing layer and the reference layer. The cushion layer may include a foam material that compresses when pressed and returns toward its original thickness when released. In some embodiments, the cushion layer returns to at least 80% of its original thickness. The cushion layer may include a number of holes devoid of material of which the cushion layer is made. The reference layer may include a number of raised areas.

The present disclosure presents several technical advantages. In one embodiment, the distance between a force sensing layer and a reference layer is uniform or substantially uniform across a touch sensing device. In an embodiment, an amount of capacitance received by a reference layer is uniform or substantially uniform across a length and width of a touch sensor of a device.

Figure 1:
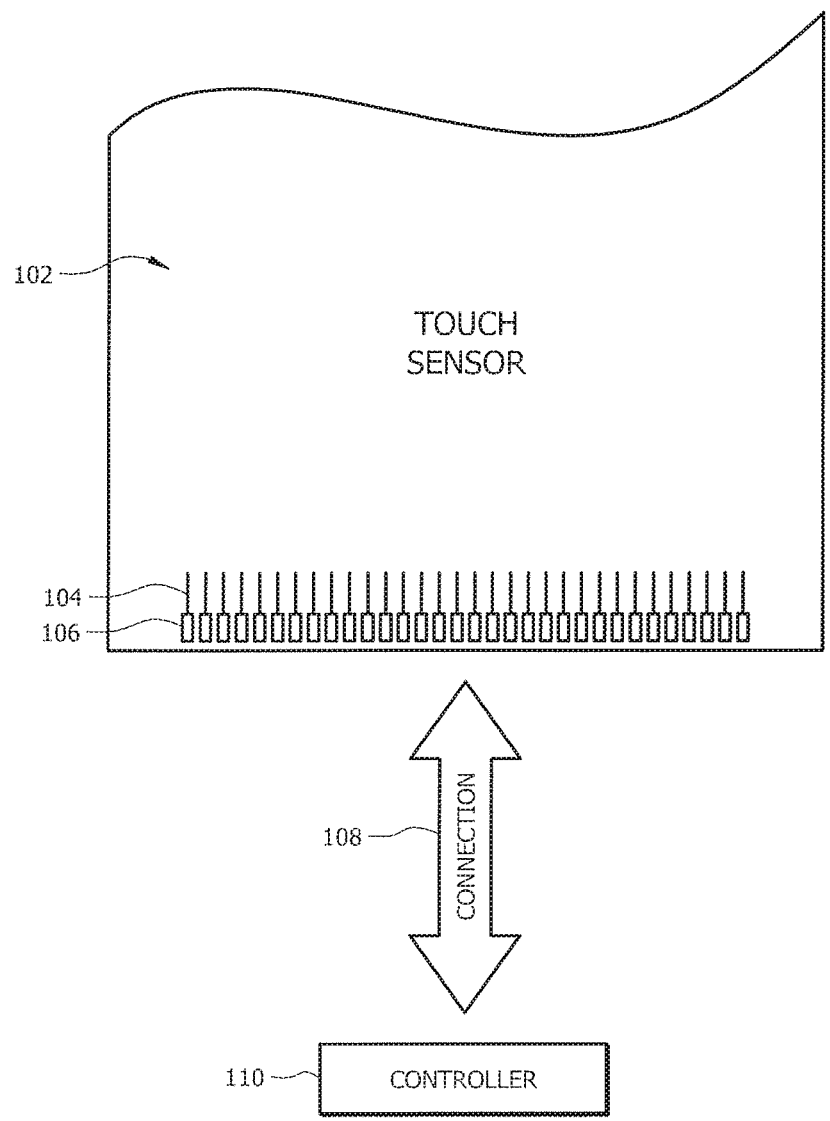
FIG. 1 illustrates a touch sensor with a controller, according to certain embodiments of the present disclosure.

FIG. 1 illustrates an example touch sensor 102 with a controller 110, according to certain embodiments of the present disclosure. Touch sensor 102 and touch-sensor controller 110 may be used, in combination to detect the presence and location of a touch or the proximity of an object within a touch-sensitive area of touch sensor 102. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 102 may include one or more touch-sensitive areas, where appropriate. Touch sensor 102 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a drive electrode or a sense electrode) may comprise an area of conductive material forming a shape, such as, for example, a disc, square, rectangle, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example, an electrode may be made of indium tin oxide (ITO) and the ITO of the electrode may occupy approximately 100% of the area of its shape, where appropriate. In particular embodiments, the conductive material of an electrode may occupy substantially less than 100% of the area of its shape. As an example, an electrode may be made of fine lines of metal or other conductive material (such as, for example, copper, silver, or a copper- or silver-based material) and the fine lines of conductive material may occupy substantially less than 100% of the area of its shape in a hatched, mesh, or other suitable pattern. Although this disclosure describes or illustrates particular electrodes made of particular conductive material forming particular shapes with particular fills having particular patterns, this disclosure contemplates any suitable electrodes made of any suitable conductive material forming any suitable shapes with any suitable fills having any suitable patterns. Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute, in whole or in part, one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

One or more portions of the substrate of touch sensor 102 may comprise polyethylene terephthalate (PET) or another suitable material. This disclosure contemplates any suitable substrate with any suitable portions made of any suitable material. In particular embodiments, the drive or sense electrodes in touch sensor 102 may comprise or consist of ITO. In particular embodiments, the drive or sense electrodes in touch sensor 102 may comprise fine lines of metal or other conductive material. As an example, one or more portions of the conductive material may be copper or copper-based and have a thickness of approximately 5 microns ($\mu m$) or less and a width of approximately 10 $\mu m$ or less. As another example, one or more portions of the conductive material may be silver or silver-based and similarly have a thickness of approximately 5 $\mu m$ or less and a width of approximately 10 $\mu m$ or less. This disclosure contemplates any suitable electrodes made of any suitable material.

Touch sensor 102 may be configured to implement a capacitive form of touch sensing. In a mutual-capacitance implementation, touch sensor 102 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 110) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 110 may measure the change in capacitance. By measuring changes in capacitance throughout the array, touch-sensor controller 110 may determine the position of the touch or proximity within the touch-sensitive area(s) of touch sensor 102.

In a self-capacitance implementation, touch sensor 102 may include an array of electrodes of a single type that may each form a capacitive node. When an object touches or comes within proximity of the capacitive node, a change in self-capacitance may occur at the capacitive node and touch-sensor controller 110 may measure the change in capacitance, for example, as a change in the amount of charge needed to raise the voltage at the capacitive node by a predetermined amount. As with a mutual-capacitance implementation, by measuring changes in capacitance throughout the array, touch-sensor controller 110 may determine the position of the touch or proximity within the touch-sensitive area(s) of touch sensor 102. This disclosure contemplates any suitable form of capacitive touch sensing, where appropriate.

Thus, a position of a touch which may initiate a capacitance change may be characterized as application of a physical force, while proximity of an object, such as a finger or a stylus which may initiate a capacitance change may be characterized as application of a virtual force.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 102 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 102 may have drive electrodes disposed in a pattern on one side of a substrate and sense electrodes disposed in a pattern on another side of the substrate. Moreover, touch sensor 102 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 102 may indicate a touch or proximity input at the position of the capacitive node. Touch-sensor controller 110 may detect and process the change in capacitance to determine the presence and location of the touch or proximity input. Touch-sensor controller 110 may then communicate information about the touch or proximity input to one or more other components (such one or more central processing units (CPUs) or digital signal processors (DSPs)) of a device that includes touch sensor 102 and touch-sensor controller 110, which may respond to the touch or proximity input by initiating a function of the device (or an application running on the device) associated with it. Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 110 may include one or more integrated circuits (ICs), such as, for example, general-purpose microprocessors, microcontrollers, programmable logic devices or arrays, application-specific ICs (ASICs). In particular embodiments, touch-sensor controller 110 comprises analog circuitry, digital logic, and digital non-volatile memory. In particular embodiments, touch-sensor controller 110 is disposed on a flexible printed circuit (FPC) bonded to the substrate of touch sensor 102, as described below. The FPC may be active or passive. In particular embodiments, multiple touch-sensor controllers 110 are disposed on the FPC. Touch-sensor controller 110 may include a processor unit, a drive unit, a sense unit, and a storage unit. The drive unit may operate to supply drive signals to the drive electrodes of touch sensor 102. The sense unit may operate to sense charge at the capacitive nodes of touch sensor 102 and provide measurement signals representing capacitances at the capacitive nodes to the processor unit. The processor unit may operate to control the supply of drive signals to the drive electrodes by the drive unit and process measurement signals from the sense unit to detect and process the presence and location of a touch or proximity input within the touch-sensitive area(s) of touch sensor 102. The processor unit may also operate to track changes in the position of a touch or proximity input within the touch-sensitive area(s) of touch sensor 102. The storage unit may operate to store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 104 of conductive material disposed on the substrate of touch sensor 102 may operably (i.e., physically and electrically) couple the drive or sense electrodes of touch sensor 102 to connection pads 106, also disposed on the substrate of touch sensor 102. As described below, connection pads 106 facilitate coupling of tracks 104 to touch-sensor controller 110. Tracks 104 may extend into or around (e.g., at the edges of) the touch-sensitive area(s) of touch sensor 102. Particular tracks 104 may provide drive connections for coupling touch-sensor controller 110 to drive electrodes of touch sensor 102, through which the drive unit of touch-sensor controller 110 may supply drive signals to the drive electrodes. Other tracks 104 may provide sense connections for coupling touch-sensor controller 110 to sense electrodes of touch sensor 102, through which the sense unit of touch-sensor controller 110 may sense charge at the capacitive nodes of touch sensor 102. Tracks 104 may be made of fine lines of metal or other conductive material. As an example, the conductive material of tracks 104 may be copper or copper-based and have a width of approximately 100 µm or less. As another example, the conductive material of tracks 104 may be silver or silver-based and have a width of approximately 100 µm or less. In particular embodiments, tracks 104 may comprise or consist of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 104, touch sensor 102 may include one or more ground lines terminating at a ground connector (which may be a connection pad 106) at an edge of the substrate of touch sensor 102 (similar to tracks 104).

Connection pads 106 may be located along one or more edges of the substrate, outside the touch-sensitive area(s) of touch sensor 102. As described above, touch-sensor controller 110 may be on an FPC. Connection pads 106 may be made of the same material as tracks 104 and may be bonded to the FPC using an anisotropic conductive film (ACF). Connection 108 may include conductive lines on the FPC coupling touch-sensor controller 110 to connection pads 106, in turn coupling touch-sensor controller 110 to tracks 104 and to the drive or sense electrodes of touch sensor 102. In another embodiment, connection pads 106 may be connected to an electro-mechanical connector (such as a zero insertion force wire-to-board connector); in this embodiment, connection 108 may not need to include an FPC. This disclosure contemplates the use of any suitable connection 108 between touch-sensor controller 110 and touch sensor 102.

Figure 2:
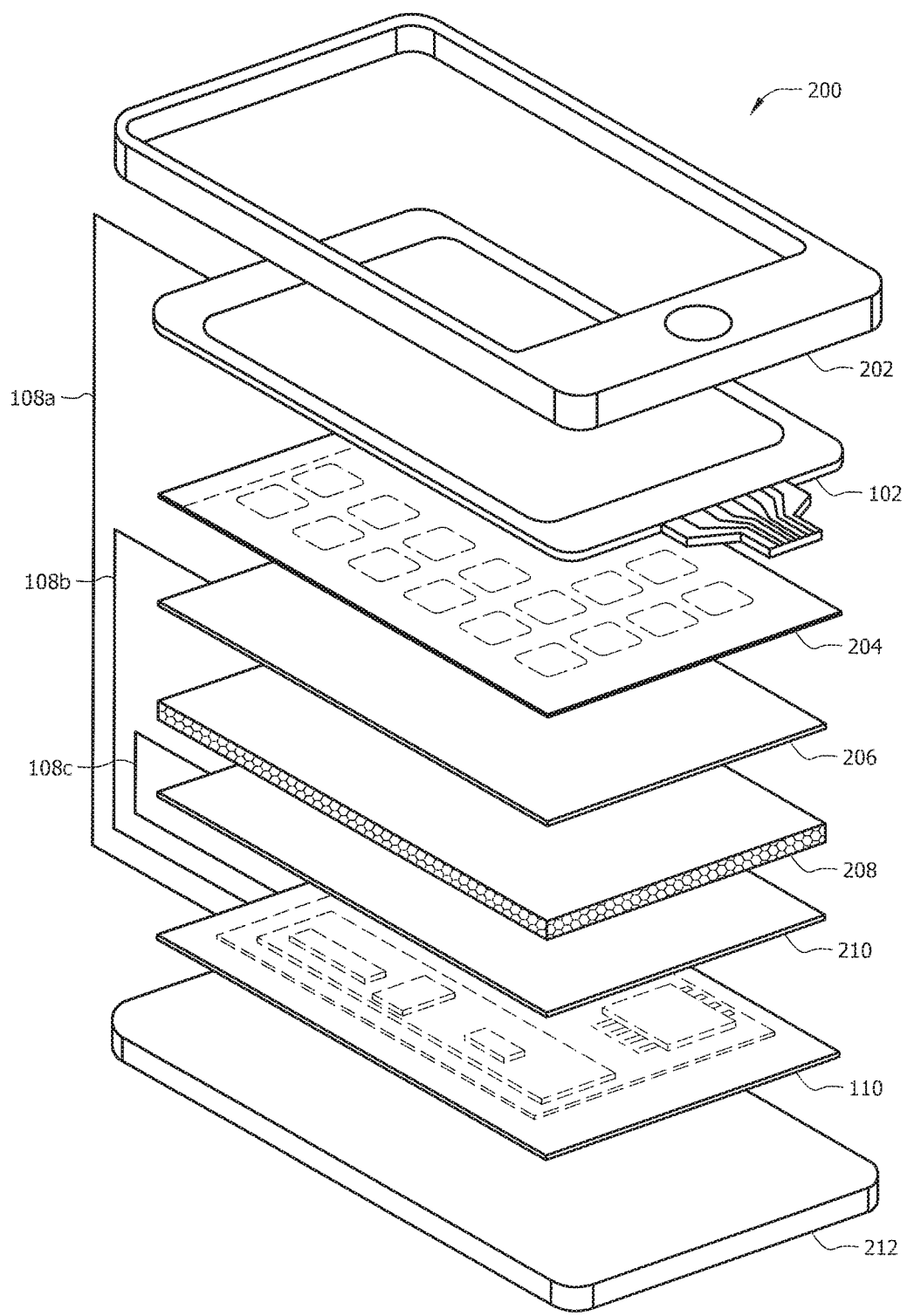
FIG. 2 illustrates a device with touch sensing capabilities, according to certain embodiments of the present disclosure.

FIG. 2 illustrates an example device 200 with touch sensing capabilities, according to certain embodiments of the present disclosure. In particular, FIG. 2 illustrates a mechanical stack of device 200, according to certain embodiments of the present disclosure. Device 200 may be any suitable type of electronic device. For example, device 200 may be a computer, a laptop, a wireless or cellular telephone, an electronic notebook, a personal digital assistant, a tablet, touch pad or any other device including touch-sensing capabilities, such as, for example, a display on a household appliance, home systems control panel, security system panel, machine tool or other manufacturing or industrial equipment, or vehicle. In the illustrated embodiment, device 200 includes cover layer 202, touch sensor 102, display 204, force sensing layer 206, cushion layer 208, reference layer 210 (which in some embodiments may be characterized as a ground layer), controller 110 coupled respectively to touch sensor 102, force sensing layer 206 and reference layer 210 by conductive lines 108a, 108b and 108c, and power supply 212.

A mechanical stack of components of device 200 may contain the substrate (or multiple substrates) and the conductive material forming the drive or sense electrodes of touch sensor 102. As an example, the mechanical stack may include a first layer of optically clear adhesive (OCA) beneath cover layer 202. The cover layer 202 may be, in whole or in part, transparent and made of a resilient material suitable for repeated touching, such as, for example, glass, polycarbonate, or poly(methyl methacrylate) (PMMA). This disclosure contemplates any suitable cover layer 202 made of any suitable material. The first layer of OCA may be disposed between cover layer 202 and the substrate of touch sensor 102 with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate of touch sensor 102 with the conductive material making up the drive or sense electrodes and the dielectric layer, and the dielectric layer may be disposed between the second layer of OCA and an air gap to display 204. As an example only, cover layer 202 may have a thickness of approximately 1 millimeter (mm), the first layer of OCA may have a thickness of approximately 0.05 mm, the substrate with the conductive material forming the drive or sense electrodes may have a thickness of approximately 0.05 mm, the second layer of OCA may have a thickness of approximately 0.05 mm, and the dielectric layer may have a thickness of approximately 0.05 mm.

Display 204 is configured to generally display images for a user. Display 204 represents any suitable component for displaying images. For example, display 204 may include a light-emitting diode display (LED), an electroluminescent display (ELD), a plasma display panel (PDP), a liquid crystal display (LCD), a thin-film transistor display (TFT), an organic light-emitting diode display (OLED), or any other suitable type of display.

Force sensing layer 206 is configured to generally facilitate determining an amount of force applied to a location on a surface of device 200, such as a surface overlying the touch sensitive area of device 200. For example, a user may press cover layer 202 (e.g., on a surface of cover layer 202 adapted to receive user input, such as, for example, the top surface of cover layer 202 in FIG. 2) to apply force to device 200. Applying force to cover layer 202 of device 200 (e.g., by a user pressing a finger, stylus, or other object against a surface of cover layer 202) generally causes force sensing layer 206 to move toward reference layer 210, and releasing a force from cover layer 202 of device 200 (e.g., by a user discontinuing pressing the finger, stylus, or other object against a surface of cover layer 202) generally causes force sensing layer 206 to move away from reference layer 210. In general, the greater the force applied to the surface of cover layer 202 of device 200, the closer force sensing layer 206 and reference layer 210 come together as the force sensing layer 206 is deflected toward the reference layer 210 under the applied force.

For purposes of this description, it should be understood that references to pressing cover layer 202 and pressing a surface of cover layer 202 may be used interchangeably and, in appropriate instances, may refer to any pressing of a surface of cover layer 202 that causes force sensing layer 206 to approach reference layer 210. The present disclosure contemplates force sensors oriented for detection of an amount of force applied to other surfaces of device 200. For example, cover layer 202 may be curved at its edges such that touch sensor 102 and display 204 (and any other suitable layers) extend to side surfaces (e.g., right, left, top, and/or bottom surfaces) of device 200. In such an example, the present disclosure contemplates force sensing layer 206, cushion layer 208, and reference layer 210 being similarly curved at their respective edges so that an amount of force applied to the side surfaces also may be detected.

Controller 110 may be programmed to determine an amount of force applied to the surface of device 200 at a location thereon by determining a value reflecting, that is corresponding to, a distance between force sensing layer 206 and reference layer 210. For example, controller 110 may facilitate providing a voltage to force sensing layer 206. Force sensing layer 206 and reference layer 210 may be capacitively coupled. For example, force sensing layer 206 and reference layer 210 may form a mutual-capacitance implementation as described in relation to FIG. 1. Thus, as force sensing layer 206 and reference layer 210 come closer together responsive to a force applied to cover layer 202 at a location thereon, capacitance increases. Controller 110 may be used to detect the change in capacitance, which may reflect, that is correspond to, the distance between force sensing layer 206 and reference layer 210. This disclosure contemplates use of controller 110 and/or any other suitable component detecting the distance and/or a change in distance between force sensing layer 206 and reference layer 210 in any suitable manner. For purposes of the present disclosure, references to determining the distance between force sensing layer 206 and reference layer 210 may include determining an actual distance between force sensing layer 206 and reference layer 210, determining a value (other than the actual distance) that corresponds to a distance between force sensing layer 206 and reference layer 210 (e.g., a capacitance or change in capacitance), or any other value that could be used to reflect an amount of force applied to a surface of device 200.

Cushion layer 208 is generally located between force sensing layer 206 and reference layer 210. Cushion layer 208 may be used to facilitate making the distance between force sensing layer 206 and reference layer 210 uniform or substantially uniform across all or substantially all of the surface of device 200 for a given received pressure as applied to cover layer 202. Cushion layer 208 may facilitate providing resistance to pressure applied to the surface of device 200. In certain embodiments, cushion layer 208 may comprise a foam material. As just one particular example, cushion layer 208 may be made of material with a durometer rating of 10-80 using the OO durometer scale. Cushion layer 208 may comprise a viscoelastic material. In certain embodiments, cushion layer 208 may be compressible. For example, cushion layer 208 may compress from an original thickness to a lesser thickness when pressure is applied to a surface of cover layer 202 of device 200. Once pressure is removed from the surface of device 200, cushion layer 208 may return to its original form or substantially near its original form. For example, cushion layer 208 may return to 70%, 80%, or 90% of its original form when pressure on cover layer 202 is released. Cushion layer 208 may include polymeric foam or any other suitable material. For example, cushion layer 208 may include polyurethane foam, low-resilience polyurethane foam, polyvinyl chloride foam, Styrofoam, polyimide foam, silicone foam, or microcellular foam. In some embodiments, cushion layer 208 has a density ranging from 20 to 100 kilograms per cubic meter. Cushion layer 208 may have a hardness ranging from 30 to 180 newtons. For example, cushion layer 208 may have a hardness of 100 newtons.

Figure 3A:
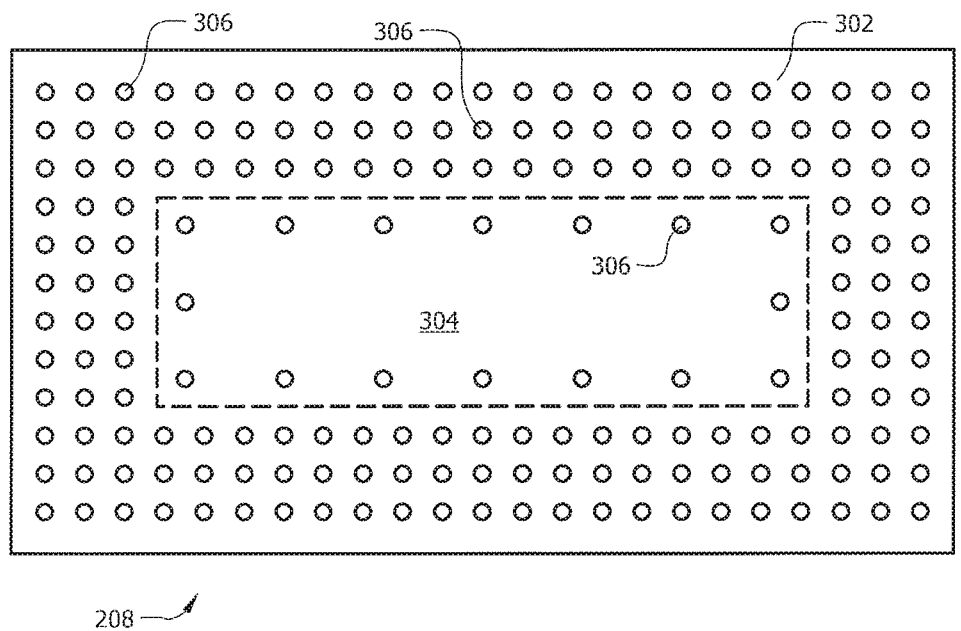
FIGS. 3A and 3B illustrate a cushion layer of a device with touch sensing capabilities, according to certain embodiments of the present disclosure.
Figure 3B:
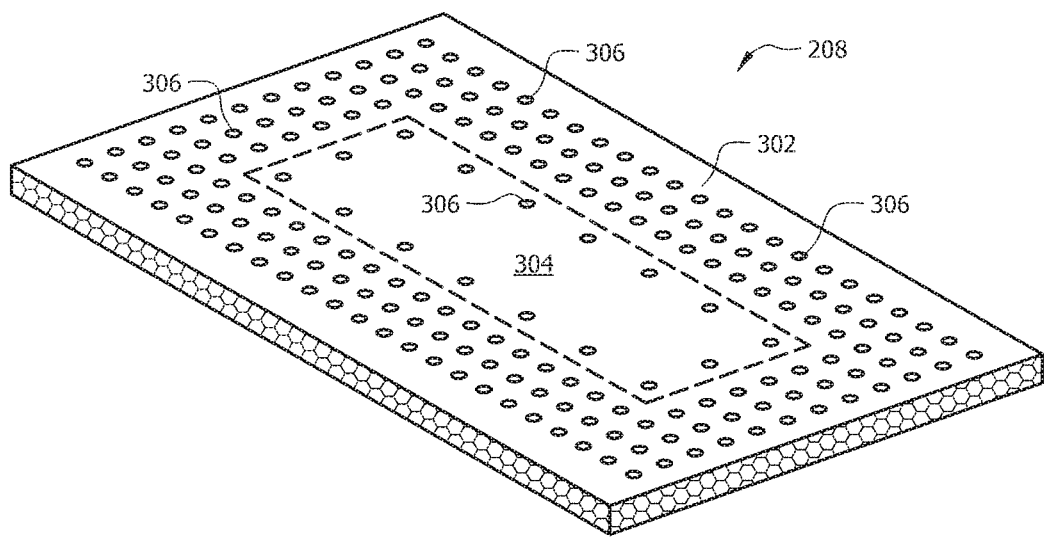

Cushion layer 208 is described in more detail in relation to FIGS. 3A and 3B. Although cushion layer 208 is described as being made of particular materials having particular characteristics, the present disclosure contemplates cushion layer 208 being made of any suitable material (and having any suitable associated characteristics) that tends to absorb a force and return completely (or substantially) to its original shape when the applied force is removed (e.g., is resilient). Additionally, any particular values related to the characteristics of cushion layer 208 are provided as non-limiting examples only.

Reference layer 210 generally includes any material that conducts electricity, and may be opaque or transparent. For example, reference layer 210 may include copper, silver, aluminum, copper-based, or silver-based material. In some embodiments, reference layer 210 is flat. In other embodiments, reference layer 210 includes one or more dimples. Reference layer 210 may include raised areas such as a stair-step design. Reference layer 210 may become gradually taller toward its outer perimeter, in some embodiments. Examples of reference layer 210 are described in more detail in relation to FIGS. 4 and 5.

In some embodiments, controller 110 is programmed to determine whether a touch is present using touch sensor 102, as previously described. In some embodiments, controller 110 may be used to determine a distance between force sensing layer 206 and reference layer 210, as described. For example, controller 110 may include a processor for determining a distance between force sensing layer 206 and reference layer 210 by determining a capacitance between these two layers. For example, controller 110 may cause a voltage to be applied to force sensing layer 206 and sense a resulting value from reference layer 210, which may be used to determine a capacitance or a change in capacitance, for example, between the two layers 206 and 210. As another example, controller 110 may cause a voltage to be applied to reference layer 210 and sense a resulting value from force sensing layer 206, which may be used to determine a capacitance or a change in capacitance, for example, between the two layers. Although the present disclosure describes particular techniques for determining a distance between force sensing layer 206 and reference layer 210, the present disclosure contemplates determining a distance between force sensing layer 206 and reference layer 210 in any suitable manner, according to particular needs.

Referring again to FIG. 2, power supply 212 generally provides electrical energy to device 200. Power supply 212 may include a rechargeable or non-rechargeable battery, in some embodiments. This disclosure contemplates power supply 212 including any suitable type of battery or other power supply. For example, power supply 212 may include one or more of an alkaline battery, a lead acid battery, a lithium-ion battery, a nickel metal hydride (NiMH) battery, or any other suitable type of battery or power supply. This disclosure contemplates power supply 212 including a single battery or any other suitable number of batteries. In some embodiments, power supply 212 may receive power from an external source. For example, power supply 212 may be configured with, for example, a transformer to facilitate receiving alternating current (AC). Power supply 212 may facilitate receiving 120 volt AC power, 240 volt AC power, or any other suitable type of electricity source. In the alternative, a 120 volt, 240 volt or other AC power source may be modified from receipt at a line voltage receptacle to a different voltage type, magnitude and amperage.

Although this disclosure describes a particular mechanical stack with a particular number of particular component layers made of particular materials and having particular thicknesses, this disclosure contemplates any suitable mechanical stack with any suitable number of any suitable component layers made of any suitable materials and having any suitable thicknesses. As an example, in particular embodiments, a layer of adhesive or dielectric may replace the dielectric layer, second layer of OCA, and air gap described above, with there being no air gap to the display. Although illustrated as layers being in a particular order, any component of device 200 may be in any suitable position.

FIGS. 3A and 3B illustrate an example cushion layer 208 of device 200, according to certain embodiments of the present disclosure. As illustrated, cushion layer 208 may include an outer perimeter region 302, a center region 304, and one or more holes 306. In the absence of cushion layer 208 (and/or reference layer 210, according to certain embodiments of the present disclosure, as described below), applying a given force to a center region of cover layer 202 causes the distance between force sensing layer 206 and reference layer 210 to decrease by an amount greater than applying the same amount of force to an outer perimeter region of cover layer 202. In certain embodiments, adding cushion layer 208, according to the present disclosure, between force sensing layer 206 and reference layer 210 reduces or eliminates these differences, allowing force sensing layer 206 and reference layer 210 to move within a more uniform distance across all or substantially all portions of the surface of cover layer 202 at a given pressure. For example, material may be added to or removed from cushion layer 208 to allow force sensing layer 206 and reference layer 210 to move within a more uniform distance across all or substantially all of cover layer 202 responsive to a given pressure applied to cover layer 202.

Outer perimeter region 302 generally represents an area of cushion layer 208 that is near the outer perimeter of cushion layer 208. Outer perimeter region 302 may include any suitable area. Outer perimeter region 302 may include 5%-95% of the surface area of cushion layer 208. For example, outer perimeter region 302 may include 10%, 40%, 60%, or 90% of the surface areas of cushion layer 208. Center region 304 represents an area of cushion layer 208 that is near the center of cushion layer 208. Center region 304 may include 5%-95% of the surface area of cushion layer 208. For example, center region 304 may include 10%, 40%, 60%, or 90% of the surface areas of cushion layer 208. Although illustrated as outer perimeter region 302 and center region 304 spanning 100% of the surface area of cushion layer 208, outer perimeter region 302 and center region 304 may span less than the entire surface area of cushion layer 208. In these embodiments, cushion layer 208 may include any suitable number of regions, for example, an intermediate region located between outer perimeter region 302 and center region 304 may be included. In such a manner, and particularly with regard to touch sensors having relatively larger surface areas, the applied force, which may also be characterized as the applied load, may be distributed more uniformly among a wide variety of locations.

Holes 306 are generally areas devoid of material from which cushion layer 208 is made. Holes 306 may be created by pressing a sharp object through cushion layer 208, drilling through cushion layer 208, using a mold form, or any other suitable method. Holes 306 may be any suitable size. Each hole 306 may be the same size. As another example, holes 306 may vary in size. For examples, one or more holes 306 in outer perimeter region 302 may be larger than holes in center region 304. Additionally, holes 306 may have varying sizes and/or shapes within each region, as appropriate. Furthermore, spacing between holes 306 may vary within each region or between the two regions, as appropriate. In addition, holes 306 may comprise blind holes extending through only a portion of the thickness of cushion layer 208. For example, holes 306, or some of them, may extend only through between about 70% and 99% of cushion layer 208. It will be understood by those of ordinary skill in the art that, in addition to modifying resiliency of different portions of cushion layer 208, the presence or absence of holes 306 as well as their sizes and shapes, also varies the dielectric constant of cushion layer 208 at particular locations, further enhancing this embodiment's ability to fine tune a given location's capacitive response to application of force. Thus, the response to application of force may be substantially linearized for different locations on touch sensor 102 by both selective modification of resiliency of cushion layer 208 as well as selective modification of the dielectric constant of the material of cushion layer.

As described, cushion layer 208 may have a particular hardness. Thus, applying pressure to a material making up cushion layer 208 causes force sensing layer 206 and reference layer 210 to move to a distance greater apart than would otherwise be reached without cushion layer 208, given the same application of pressure. However, holes 306 may lessen (or remove) this effect of cushion layer 208 in the region where the hole 306 is located. For example, an area including a one or more holes 306 may have a hardness less than an area without a hole 306. Thus, by selectively locating and forming holes 306, cushion layer 308 may allow force sensing layer 206 and reference layer 210 to move in a uniform or substantially uniform manner across any portion of cover layer 202 responsive to a given pressure. In certain embodiments, the size of the areas that constitute outer perimeter region 302 and center region 304, and the placement, shape, and spacing of associated holes 306 within each region, may be optimized to allow force sensing layer 206 and reference layer 210 to move within a more uniform distance across all or substantially all of portions of cover layer 202 at a given pressure, according to particular needs.

Although described as removing material from cushion layer 308, the same benefit of increasing uniformity may be realized by adding material to cushion layer 308. For example, center region 304 may include more material than outer perimeter region 302. For example, center region 304 may have a greater density than outer perimeter region 302. As another example, center region 304 may have a greater thickness than outer perimeter region 302.

Figure 4:
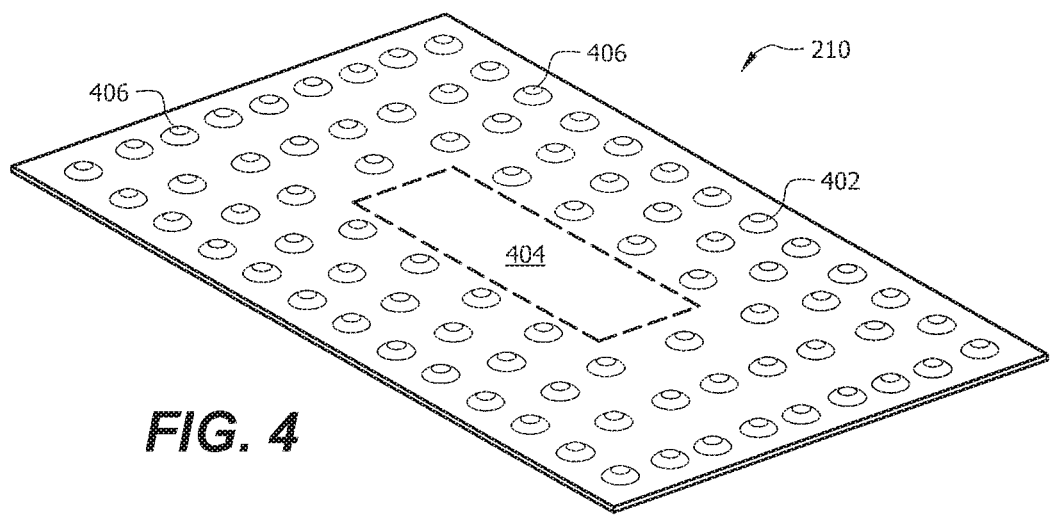
FIG. 4 illustrates a reference layer of a device with touch sensing capabilities, according to certain embodiments of the present disclosure.

FIG. 4 illustrates a reference layer 210 of device 200, (see FIG. 2), according to certain embodiments of the present disclosure. As illustrated, reference layer 210 may include an outer perimeter region 402, a center region 404, and a plurality of dimples 406, which may also be characterized as protrusions. Dimples 406 may be raised areas on one surface of reference layer 210 and concave areas on the opposite surface of reference layer 210. In the illustrated orientation, a surface of reference layer 210 is shown in which dimples 406 are raised areas. In certain embodiments, the surface of reference layer 210 that includes the raised areas of dimples 406 is oriented toward force sensing layer 206 and cushion layer 208 (if included in the same embodiment).

The one or more dimples 406 generally comprise the same or substantially the same material as remaining portions of reference layer 210. In some embodiments, the one or more dimples 406 may be of a different material than the rest of reference layer 210. Each of the one or more dimples 406 may have a height and size. The size may indicate the surface area of a dimple 406, in some embodiments.

As described above, in the absence of reference layer 210 modified according to certain embodiments of the present disclosure (and/or cushion layer 208), applying a given force to a center region of cover layer 202 causes the distance between force sensing layer 206 and reference layer 210 to decrease by an amount greater than applying the same amount of force to an outer perimeter region of cover layer 202. In certain embodiments, adding a reference layer 210 modified according to certain embodiments of the present disclosure (e.g., with dimples 406) reduces or eliminates these differences, allowing force sensing layer 206 to move a more uniform distance toward reference layer 210 across all or substantially all of cover layer 202 at a given pressure. For example, dimples may be added to or otherwise formed in reference layer 210 to allow force sensing layer 206 to move a more uniform distance toward reference layer 210 across all or substantially all of cover layer 202 at a particular pressure.

A raised area (e.g., the raised area of a dimple 406) of reference layer 210 receives a higher capacitance than an unraised area of reference layer 210 because the raised area is closer to force sensing layer 206. This disclosure contemplates taking advantage of the increased capacitance provided by a dimple 406 to provide uniformity of capacitance modification to substantially all portions of force sensing layer 206. While it may require greater pressure to decrease the distance between force sensing layer 206 and reference layer 210 in outer perimeter region 402 compared to center region 404 (e.g., in the absence of cushion layer 208 and/or a reference layer 210 modified according to certain embodiments of the present disclosure), dimples 406 allow a raised area of reference layer 210 to receive a greater amount of capacitance than an area without a dimple 406. Thus, dimples 406 may be located in outer perimeter region 402 to make up for the relative differences in distance (between force sensing layer 206 and reference layer 210) otherwise resulting from a given pressure being applied to cover layer 202 in the center and outer regions. Placing dimples 406 in outer perimeter region 402 allows an increased capacitance to be generated between force sensing layer 206 and reference layer 210 at outer perimeter region 402 compared to center region 404 at given pressure. In certain embodiments, this may allow a uniform or near uniform capacitance between force sensing layer 208 and reference layer 210 across all or substantially all of cover layer 202 at a given pressure, thus enabling substantial normalization of response to applied pressure at any given location on cover layer 202. For example, outer perimeter region 402 of reference layer 210 may include a higher density of dimples 406 or dimples 406 of a greater size than center region 404 of reference layer 210. Thus, although force sensing layer 206 and reference layer 210 may not move at as great of a distance near outer perimeter region 402 compared to center region 404 in response to a given particular pressure in a respective region of cover layer 202, dimples 406 may allow a uniform or near uniform capacitance between force sensing layer 206 and reference layer 210 to result from touches in different areas across all or substantially all of cover layer 202 in response to a given pressure at a corresponding region of cover layer 202. In some embodiments, a center region of reference layer 210 may not include any dimples 406.

Figure 5:
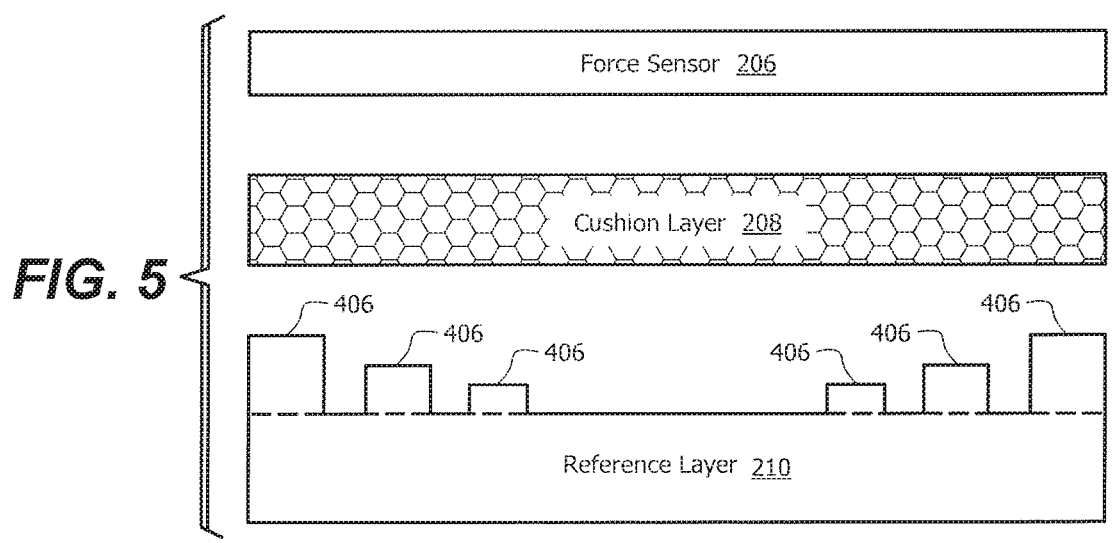
FIG. 5 illustrates a component stack of a device with touch sensing capabilities, according to certain embodiments of the present disclosure.

FIG. 5 illustrates a component stack of a device 200, according to certain embodiments of the present disclosure. The illustrated, non-limiting example stack includes force sensor 206, cushion layer 208, and reference layer 210. In certain embodiments, dimples 406 may each be of a single height. In another example, dimples 406 may vary in height. As illustrated, in one example, dimples 406 may be largest at the outer perimeter of outer perimeter region 402 (FIG. 4) and gradually decrease in height toward center region 404 (FIG. 4). As described, in certain embodiments, dimple 406 height at particular locations of reference layer 210 may be optimized to allow uniformity of capacitance across reference layer 210 at a given pressure on cover layer 202. Center region 404 may not have any dimples, in some embodiments.

Although illustrated and described as dimples 406 being convex dimples, dimples 406 may be concave dimples, that is to say dimples facing away from force sensing layer 206. In this embodiment, center region 404 may have a higher density of dimples 406 than outer perimeter region 402.

FIG. 5 illustrates an example mechanical stack for a device 200 that includes both cushion layer 208 and a reference layer 210 modified according to certain embodiments of the present disclosure (e.g., with dimples 406). It should be understood, however, that the present disclosure contemplates a device 200 including cushion layer 208 and a reference layer 210 modified according to certain embodiments of the present disclosure (e.g., with dimples 406) alone or in combination, according to particular needs.

Figure 6:
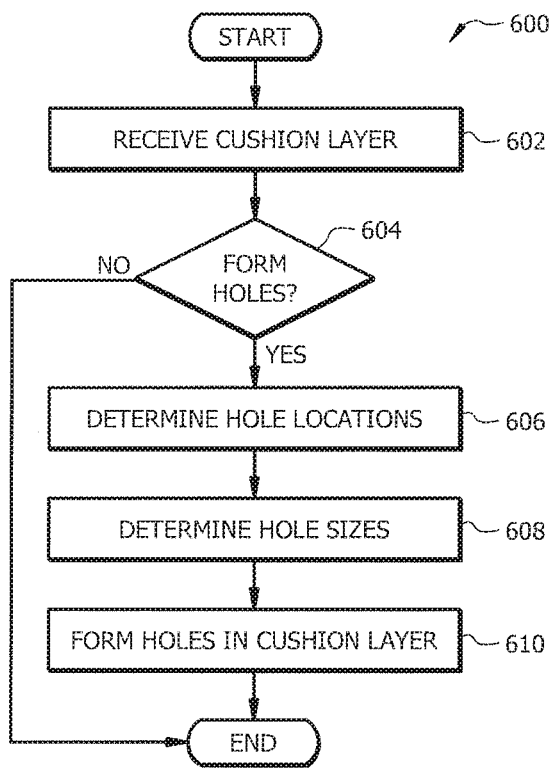
FIG. 6 illustrates a method for creating a cushion layer, according to certain embodiments of the present disclosure.

FIG. 6 illustrates an example method 600 for creating cushion layer 208, according to certain embodiments of the present disclosure. The method starts at act 602, by receiving cushion layer 208. At act 604, it is determined whether to form holes 306 in cushion layer 208. If holes 306 are not formed, method 600 ends.

Otherwise, the method 600 proceeds to acts 606 and 608 where hole 306 sizes and hole 306 locations are determined, respectively. As described, holes 306 may reduce the hardness of areas of cushion layer 208, allowing the cushion layer 208 to have a reduced hardness at areas where holes 306 are present. Larger holes 306 and a higher density of holes 306 generally decrease the hardness of cushion layer 208 at a greater rate than smaller holes 306 and a smaller density of holes 306.

Device 200 may be tested to determine hole 306 sizes and hole 306 locations. For example, a uniform pressure may be applied across all or substantially all of the surface of device 200 to determine a distance between force sensing layer 206 and reference layer 210 at different portions of device 200. Hole 306 sizes and locations may be determined using the distance at each portion. For example, a larger distance between force sensing layer 206 and reference layer 210 may require a larger hole 306 and/or a greater density of holes 306. Hole 306 sizes and locations may be calculated such that a distance cushion layer 208 is compressed responsive to application of a given force between reference layer 210 and force sensing layer 206 is uniform within a suitable percentage range. For example, the distance given a pressure may be within 1%, 5%, or 10% across substantially all the surface areas of device 200 so that a capacitance response for an applied force is substantially normalized across substantially all of the touch screen surface area of device 200. Once hole 306 locations and hole 306 sizes are determined, the holes are formed in cushion layer 208 at act 610 before the method 600 ends. As described, holes 306 may be cut, drilled, or molded into cushion layer 208.

Modifications, additions, or omissions may be made to method 600 depicted in FIG. 6. Method 600 may include more, fewer, or other acts. For example, acts may be performed in parallel or in any suitable order.

Figure 7:
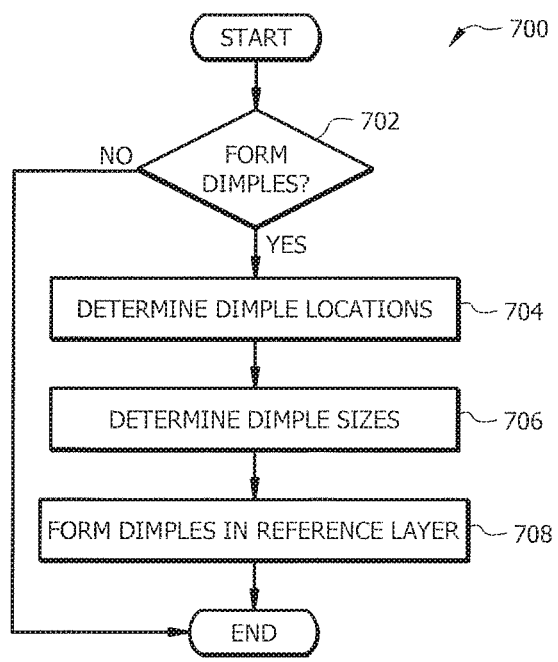
FIG. 7 illustrates a method for creating a reference layer, according to certain embodiments of the present disclosure.

FIG. 7 illustrates an example method 700 for creating reference layer 210, according to certain embodiments of the present disclosure. The method begins at act 702, where it is determined whether to form dimples 406 in reference layer 210. If dimples 406 are not formed, method 700 ends.

Otherwise, the method 700 proceeds to acts 704 and 706 where dimple 406 locations and sizes are determined, respectively. As described, dimples 406 may increase received capacitance of areas of reference layer 210, allowing the reference layer 210 to receive a more uniform capacitance at a given pressure. Dimples 406 of a greater height and/or density generally increase the capacitance received by reference layer 210 responsive to an applied force at a greater rate than dimples 406 of a smaller height and/or density.

Device 200 may be tested to determine dimple 406 heights and dimple 406 locations. For example, a uniform pressure may be applied across all or substantially all of the touch screen surface area of device 200 to determine a magnitude of distance reduction between force sensing layer 206 and reference layer 210 at different portions of device 200 responsive to a fixed applied force. Dimple 406 sizes and locations may be determined using the distance. For example, a larger distance between force sensing layer 206 and reference layer 210 may require a larger dimple 406 and/or a greater density of dimples 406. On the other hand, deflection of force sensing layer 206 toward reference layer 210 at the center of device 200 may be significantly greater than at the periphery for the same applied force, indicating that larger dimples 406 should be placed closer to the perimeter, as illustrated in FIG. 5. Dimple 406 sizes and locations may be calculated such that capacitance received across reference layer 210 is uniform within a suitable percentage range. For example, capacitance received across reference layer 210 given a pressure may be within 1%, 5%, or 10% across all of substantially all of reference layer 210. Once dimple 406 locations and sizes are determined, the dimples 406 are formed in reference layer 210 at act 708 before the method 700 ends. For example, dimples 406 may be formed by adding material to reference layer 210 and/or using a molding device to form dimples in a substrate of a reference layer 210 in an injection molding process.

Modifications, additions, or omissions may be made to method 700 depicted in FIG. 7. Method 700 may include more, fewer, or other acts. For example, acts may be performed in parallel or in any suitable order.

Figure 8:
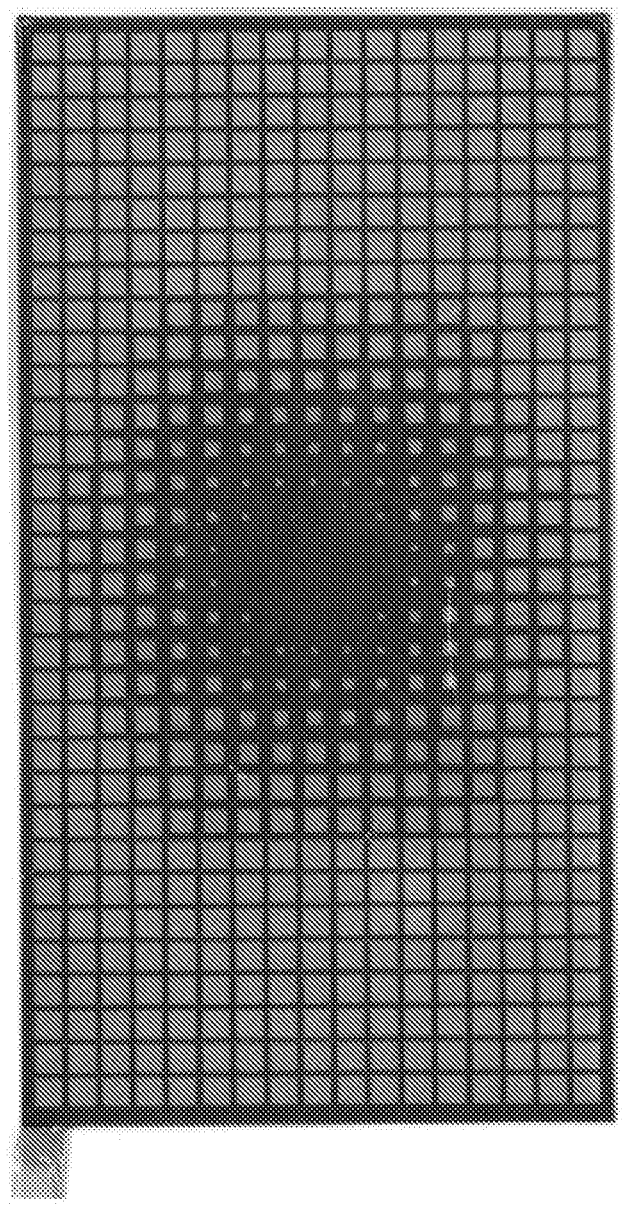
FIG. 8 shows a cushion layer according to certain embodiments of the present disclosure.
Figure 9:
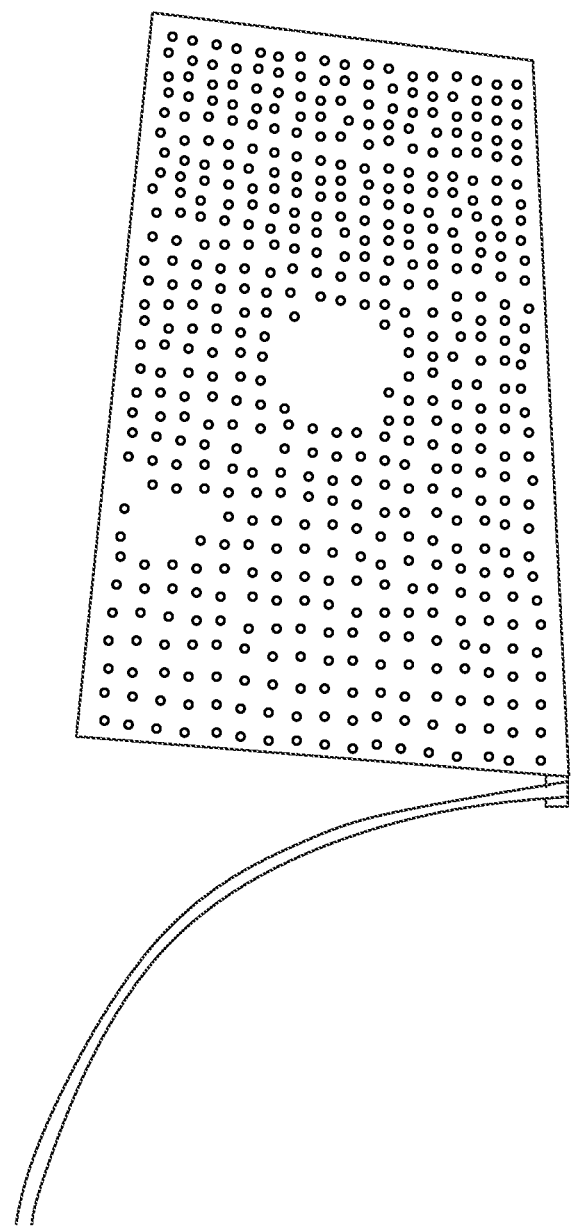
FIG. 9 shows a reference layer according to certain embodiments of the present disclosure.

FIGS. 8 and 9 show additional examples of cushion layer 208 and reference layer 210, respectively, according to certain embodiments of the present disclosure.

FIG. 8 shows a cushion layer 208 according to certain embodiments of the present disclosure. The cushion layer 208 shown in FIG. 8 includes square holes (rather than the round holes shown in the examples of FIGS. 3A and 3B) dispersed throughout cushion layer 208. In the illustrated example, the darker regions represent the presence of the material of cushion layer 208 and the lighter regions represent holes in cushion layer 208. As shown, the square holes have a particular and relatively consistent size toward the perimeter of cushion layer 208 and then decrease gradually in size as they approach the center area of cushion layer 208 until no holes are present in the center area. The same type of gradually decreasing size of holes could be applied to the holes 306 shown in the example cushion layer 208 shown in FIGS. 3A and 3B. Although the example cushion layer 208 shown in FIG. 8 includes holes having a particular shape, placement, spacing, and other characteristics, the present disclosure contemplates holes having any suitable shape, placement, spacing, and other characteristics, according to particular needs.

FIG. 9 shows a reference layer 210 according to certain embodiments of the present disclosure. FIG. 9 shows what, in certain embodiments, may be considered the bottom surface of reference layer 210 (e.g., the surface that faces away from the cover layer 202 of device 200. The concave areas of the dimples (e.g., dimples 406 of FIGS. 4 and 5) can be seen from this view. Although the reference layer 210 shown in FIG. 9 includes dimples having a particular shape, placement, spacing, depth, and other characteristics, the present disclosure contemplates the dimples having any suitable shape, placement, spacing, depth, and other characteristics, according to particular needs.

Herein, reference to a computer-readable storage medium may include a semiconductor-based or other IC (such, as for example, a field-programmable gate array (FPGA) or an ASIC), a hard disk drive (HDD), a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, another suitable computer-readable storage medium, or a suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the embodiments described and illustrated herein that a person having ordinary skill in the art would comprehend. Similarly, where appropriate, the appended claims and legal equivalents encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A touch screen device comprising:
    a controller comprising a processor, the processor configured to detect a capacitance between locations of a force sensing layer and corresponding locations of a reference layer spaced from the force sensing layer responsive to an initiated voltage; and
    a cushion layer between the force sensing layer and the reference layer, the cushion layer comprising a foam material that is configured to compress to a different extent under a same force applied to different locations and provide a different dielectric constant at the different locations.

2. The touch screen device of claim 1, wherein the foam material is configured to return to at least 80% of an original thickness upon release of the applied force.

3. The touch screen device of claim 1, wherein the processor is configured to determine a location of a physical or virtual force applied to a particular location of the force sensing layer responsive to a predetermined magnitude of change in capacitance.

4. The touch screen device of claim 1, wherein the cushion layer comprises:
    an outer perimeter region and a center region, wherein the cushion layer comprises holes at least partially therethrough; and
    a density of holes being greater proximate an outer perimeter region of the cushion layer than proximate a center region of the cushion layer.

5. The touch screen device of claim 4, wherein the center region of the cushion layer is devoid of holes.

6. The touch screen device of claim 1, wherein at least one of the cushion layer and the reference layer is configured to substantially normalize a capacitance value of any location of the force sensing layer and a corresponding location of the reference layer responsive to application of a physical or virtual force.

7. A touch screen device comprising:
    a controller comprising a processor, the processor configured to detect a capacitance between locations of a force sensing layer and corresponding locations of a reference layer spaced from the force sensing layer responsive to an initiated voltage; and
    a cushion layer between the force sensing layer and the reference layer, the cushion layer comprising a foam material that is configured to compress to a different extent under a same force applied to different locations and provide a different dielectric constant at the different locations;

wherein the reference layer comprises an outer perimeter region and a center region, wherein the reference layer comprises discrete, laterally spaced raised areas, wherein:
   each of the raised areas has a height; and
   one or more of a density of raised areas and the height of raised areas being different proximate the outer perimeter region of the reference layer than proximate the center region of the reference layer.

8. The touch screen device of claim 7, wherein the center region of the reference layer is devoid of raised areas.

9. An apparatus comprising:
   a force sensing layer;
   a reference layer spaced from and aligned with the force sensing layer;
   electrode locations within an area between the force sensing layer and the reference layer;
   a cushion layer between the force sensing layer and the reference layer, the cushion layer comprising a foam material that is configured to compress to a different extent under a same force applied to different locations and provide a different dielectric constant at the different locations; and
   a controller comprising a processor;
   wherein at least one of the reference layer and the cushion layer is configured to substantially normalize capacitance between the force sensing layer and the reference layer at electrode locations within the area responsive to a given applied virtual or physical force when a voltage is applied at the electrode locations; and
   wherein the processor is configured to detect the capacitance between the force sensing layer and the reference layer at the electrode locations responsive to an initiated voltage.

10. The apparatus of claim 9, wherein the cushion layer is configured to provide greater resistance to application of physical force to the force sensing layer proximate a center region thereof than proximate an outer perimeter region thereof.

11. The apparatus of claim 10, wherein the cushion layer comprises a pattern of holes, locations and relative sizes of the holes configured to allow substantially uniform deflection of the force sensing layer at the electrode locations.

12. The apparatus of claim 11, wherein the cushion layer has no holes in the center region.

13. The apparatus of claim 9, wherein the reference layer is configured with protrusions corresponding to electrode locations at least within an outer perimeter region thereof.

14. The apparatus of claim 13, wherein the protrusions are of various heights, heights of the protrusions within the outer perimeter region thereof closer to an outer extent of the reference layer being greater than heights of protrusions closer to a center region thereof.

15. The apparatus of claim 13, wherein there are no protrusions in a center region of the reference layer.

16. A method of operating a touch screen assembly, the method comprising:
   applying a force to different locations on a force sensing layer of a touch screen;
   compressing a cushion layer comprising a foam material between the force sensing layer and a reference layer responsive to the force, the cushion layer configured to compress to a different extent under a same force applied to the different locations and provide a different dielectric constant at the different locations;
   substantially linearizing a capacitive response to the applied force at the different locations; and
   detecting, using a processor of a controller, a capacitance between locations of the force sensing layer and corresponding locations of the reference layer spaced from the force sensing layer responsive to an initiated voltages.

17. The method of claim 16, wherein substantially linearizing the capacitive response at the different locations comprises providing the cushion layer exhibiting a different resiliency to application of force at the different locations.

18. The method of claim 16, wherein substantially linearizing the capacitive response at the different locations comprises employing the reference layer having a different proximity to the force sensing layer of the assembly at different locations.

* * * * *